United States Patent
Flemming

(10) Patent No.: US 8,604,747 B2
(45) Date of Patent: Dec. 10, 2013

(54) PORTABLE BATTERY CHARGING APPARATUS

(75) Inventor: Peter Flemming, Belvidere, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 329 days.

(21) Appl. No.: 13/072,245

(22) Filed: Mar. 25, 2011

(65) Prior Publication Data

US 2012/0242277 A1  Sep. 27, 2012

(51) Int. Cl.
*H02J 7/14* (2006.01)

(52) U.S. Cl.
USPC .......................................... 320/104; 320/105

(58) Field of Classification Search
USPC .................................. 320/104, 105
See application file for complete search history.

(56) References Cited

U.S. PATENT DOCUMENTS

| | | | |
|---|---|---|---|
| 4,161,682 A * | 7/1979 | Corvette | 320/105 |
| 4,902,955 A * | 2/1990 | Manis et al. | 320/105 |
| 5,083,076 A * | 1/1992 | Scott | 320/105 |
| 5,982,138 A * | 11/1999 | Krieger | 320/105 |
| 5,998,961 A * | 12/1999 | Brown | 320/105 |
| 7,043,283 B2 * | 5/2006 | Domes | 455/575.1 |
| 7,471,000 B1 * | 12/2008 | Ruiz | 290/1 A |
| 7,622,890 B2 * | 11/2009 | Krampitz et al. | 320/105 |
| 7,945,067 B2 * | 5/2011 | Mott et al. | 381/334 |
| 8,076,900 B1 * | 12/2011 | Brown | 320/105 |
| 2001/0025618 A1 * | 10/2001 | Kelling | 123/179.28 |
| 2005/0258797 A1 * | 11/2005 | Hung | 320/105 |
| 2006/0028177 A1 * | 2/2006 | Ferro et al. | 320/114 |
| 2008/0258680 A1 * | 10/2008 | Frerking et al. | 320/107 |
| 2010/0213892 A1 * | 8/2010 | DeSanctis | 320/107 |

* cited by examiner

*Primary Examiner* — M'Baye Diao

(74) *Attorney, Agent, or Firm* — McAndrews, Held & Malloy, Ltd.

(57) ABSTRACT

An embodiment of the present invention is directed to a portable battery charging apparatus. The portable battery charging apparatus includes a main body, wheels attached to a base portion of the main body, a battery charger disposed within the main body, and an electrical functional unit disposed within the main body that has a function other than battery charging.

15 Claims, 4 Drawing Sheets

PORTABLE BATTERY CHARGING APPARATUS

BACKGROUND

1. Field

Embodiments of the present invention generally relate to the field of vehicle battery chargers.

2. Background

In typical households, garage space, particularly for storage of non-vehicular items, is limited. Thus, consumers are often forced to choose between one item or another simply because their garage does not have enough space to accommodate both.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An embodiment of the present invention is directed to a portable battery charging apparatus. The portable battery charging apparatus includes a main body, wheels attached to a base portion of the main body, a battery charger disposed within the main body, and an electrical functional unit disposed within the main body that has a function other than battery charging.

In one embodiment, the electrical functional unit is a fan. In alternative embodiments, the electrical functional unit could be an audio system, a vacuum or a flood light. In various embodiments, the main body may have a control panel used to control the electrical functional unit.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
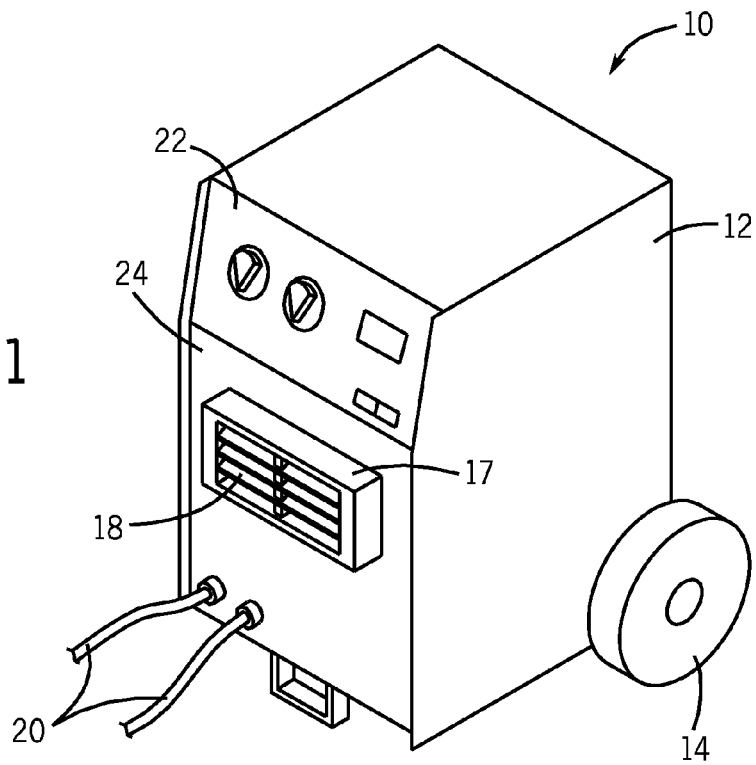
FIG. 1 is a perspective view of a portable battery charging apparatus including a high-volume fan, in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known components and circuits have not been described in detail as not to unnecessarily obscure aspects of the present invention.

Generally speaking, embodiments provide for a portable battery charging apparatus 10 that can also simultaneously provide one or more functionalities other than battery charging. The portable battery charging apparatus 10 may include a high-volume fan 16, an audio system 26, a flood light 34, a vacuum 40 and/or other electrical functional units to provide functionalities other than battery charging. In various embodiments, the portable battery charging apparatus may include a control panel 22 that controls the electrical functional unit. The electrical functional unit, including, but not limited to those discussed above, may be rechargeable and removable from the main body 12.

FIG. 1 illustrates a portable battery charging apparatus 10, in accordance with an embodiment of the present invention. The portable battery charging apparatus 10 includes a main body 12 having a base portion and a battery charger disposed within the main body (not shown). The portable battery charging apparatus 10 charges a vehicle battery through the charging cables 20. The charging cables 20 could be positioned in numerous places on the main body 12. The base portion of the main body 12 may include wheels 14 adapted for moving the portable battery charging apparatus from one location to another. The battery charging apparatus 10 includes an electrical functional unit. In the embodiment illustrated in FIG. 1, the electrical functional unit is a high-volume fan 16. The high-volume fan 16 has an output 17 that expels air. One or more adjustable deflectors 18 direct the expelled air in one or more desired directions. The output 17 may be located on the upper portion of the front face 24 distal to the base portion of the main body 12. Alternatively, the output 17 may be located on the lower portion of the front face 24 proximate to the base portion of the main body 12. Other possible positions of the output 17 are contemplated herein. The battery charging apparatus 10 may also include a control panel 22 that controls the high-volume fan 16. For example, the control panel 22 may have controls for fan speed, air temperature, oscillation, etc.

Figure 2:
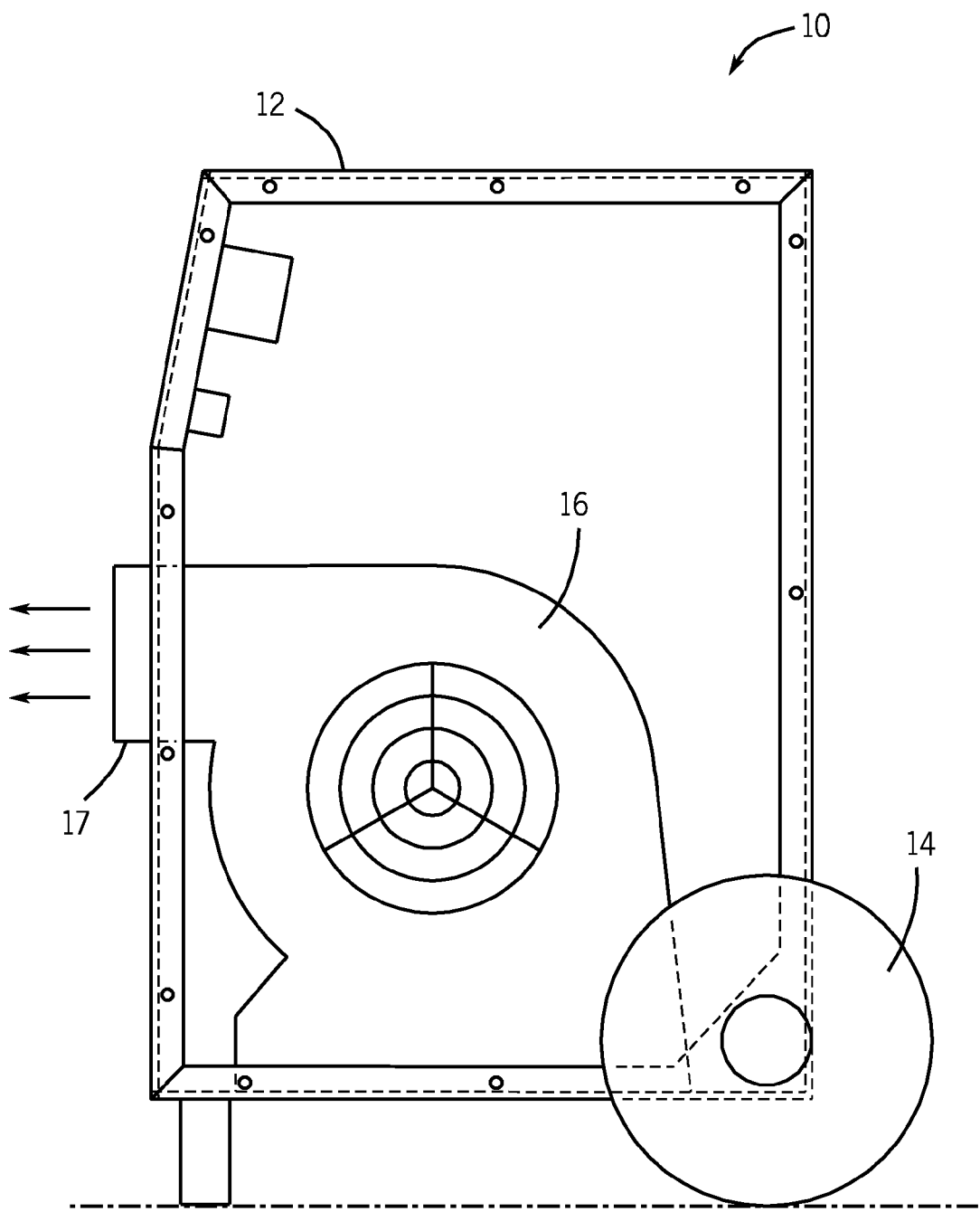
FIG. 2 is a cutaway side view of the portable battery charging apparatus of FIG. 1, in accordance with an embodiment of the present invention.

FIG. 2 is a cutaway side view of the embodiment of FIG. 1. The high-volume fan 16, disposed within the main body 12 may be positioned as shown in FIG. 2 such that the output 17 is located on the upper portion of the front face 24 distal to the base portion of the main body 12. Alternatively, the high-volume fan 16 may be positioned such that the output 17 is located on the lower portion of the front face 24 proximate to the base portion of the main body 12. In this latter embodiment, the expelled air might serve to dry a surface or displace debris that has accumulated on a surface.

Figure 3:
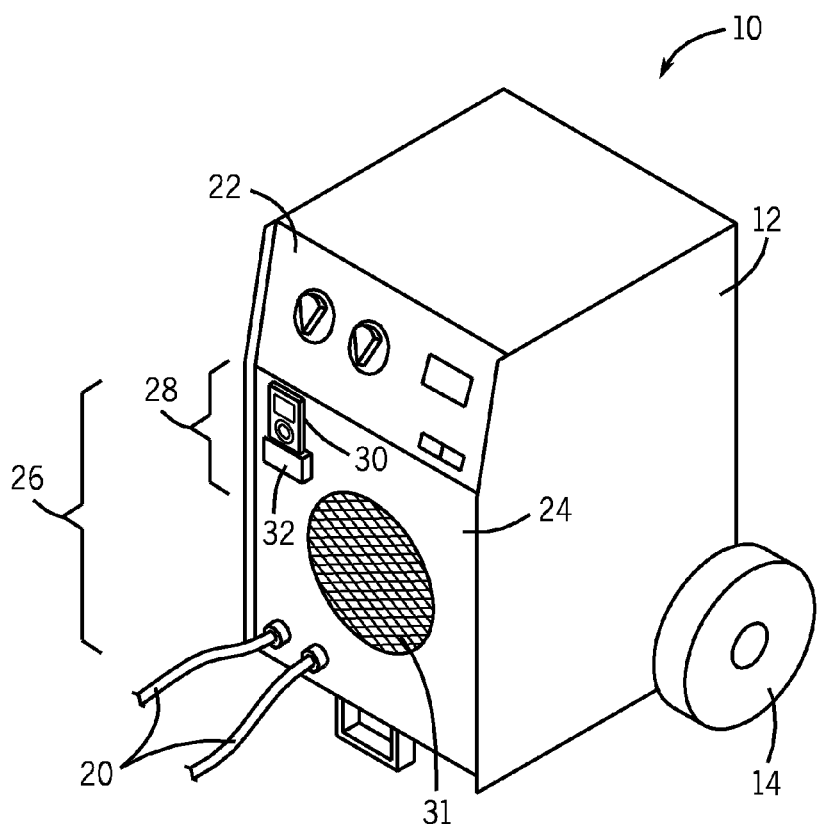
FIG. 3 is a perspective view of a portable battery charging apparatus including an audio system, in accordance with an embodiment of the present invention.

FIG. 3 illustrates a portable battery charging apparatus in accordance with another embodiment of the present invention. In the illustrated embodiment, an electrical functional unit of the battery charging apparatus 10 comprises an audio system 26. The audio system 26 may include an audio source 28 and at least one speaker 31. The audio source 28 could be a docking station 32 capable of receiving audio from a portable media player 30. Alternatively, the audio source 28 may be an AM/FM radio, a cassette tape player, a CD player, a satellite radio, etc. In the illustrated embodiment, the control panel 22 may control the audio system 26. In embodiments that have been configured with an audio system 26, the control panel 22 may include controls for volume, song selection, bass and treble, etc.

Figure 4:
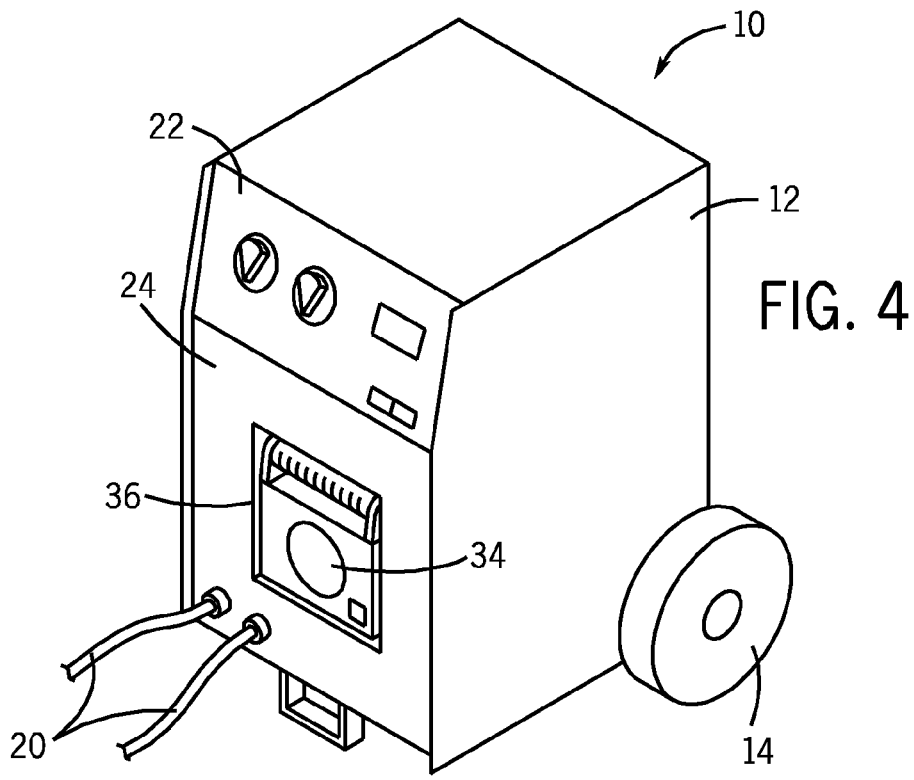
FIG. 4 is a perspective view of a portable battery charging apparatus including a removable flood light, in accordance with an embodiment of the present invention.
Figure 5:
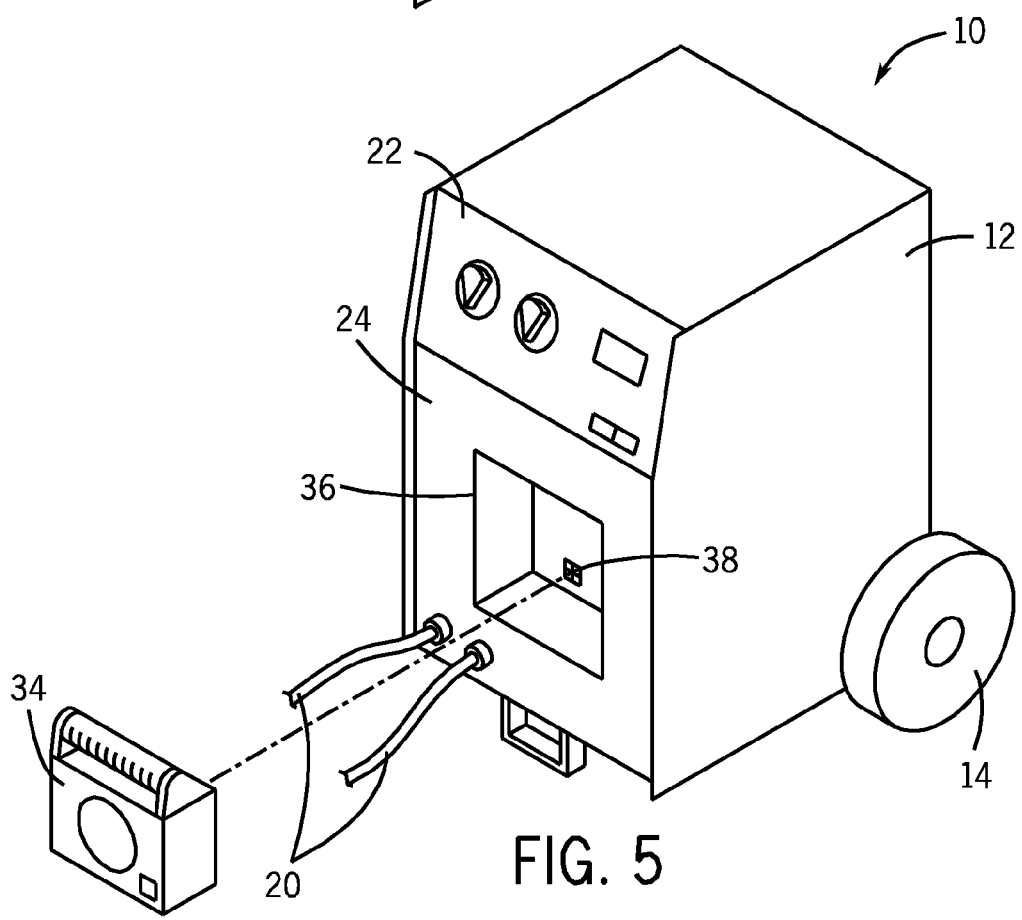
FIG. 5 is a perspective view of the portable battery charging apparatus of FIG. 4, showing the flood light removed from the main body, in accordance with an embodiment of the present invention.

FIGS. 4 & 5 illustrate a portable battery charging apparatus 10 in which the electrical functional unit comprises a rechargeable and removable flood light 34. The rechargeable and removable flood light 34 may fit into an inset cavity 36 of the main body 12. The rechargeable and removable flood light 34 is operable while attached to the main body 12, as shown in FIG. 4. The rechargeable and removable flood light 34 recharges when connected to the portable battery charging apparatus via charging contacts 38. The rechargeable and removable flood light 34, is also operable when removed from the inset cavity 36 of the main body 12, as shown in FIG. 5. In the illustrated embodiment, the control panel 22 may control the rechargeable and removable flood light 34, including controls for turning the flood light 34 on and off, for adjusting light intensity and/or for adjusting light dispersion area.

Figure 6:
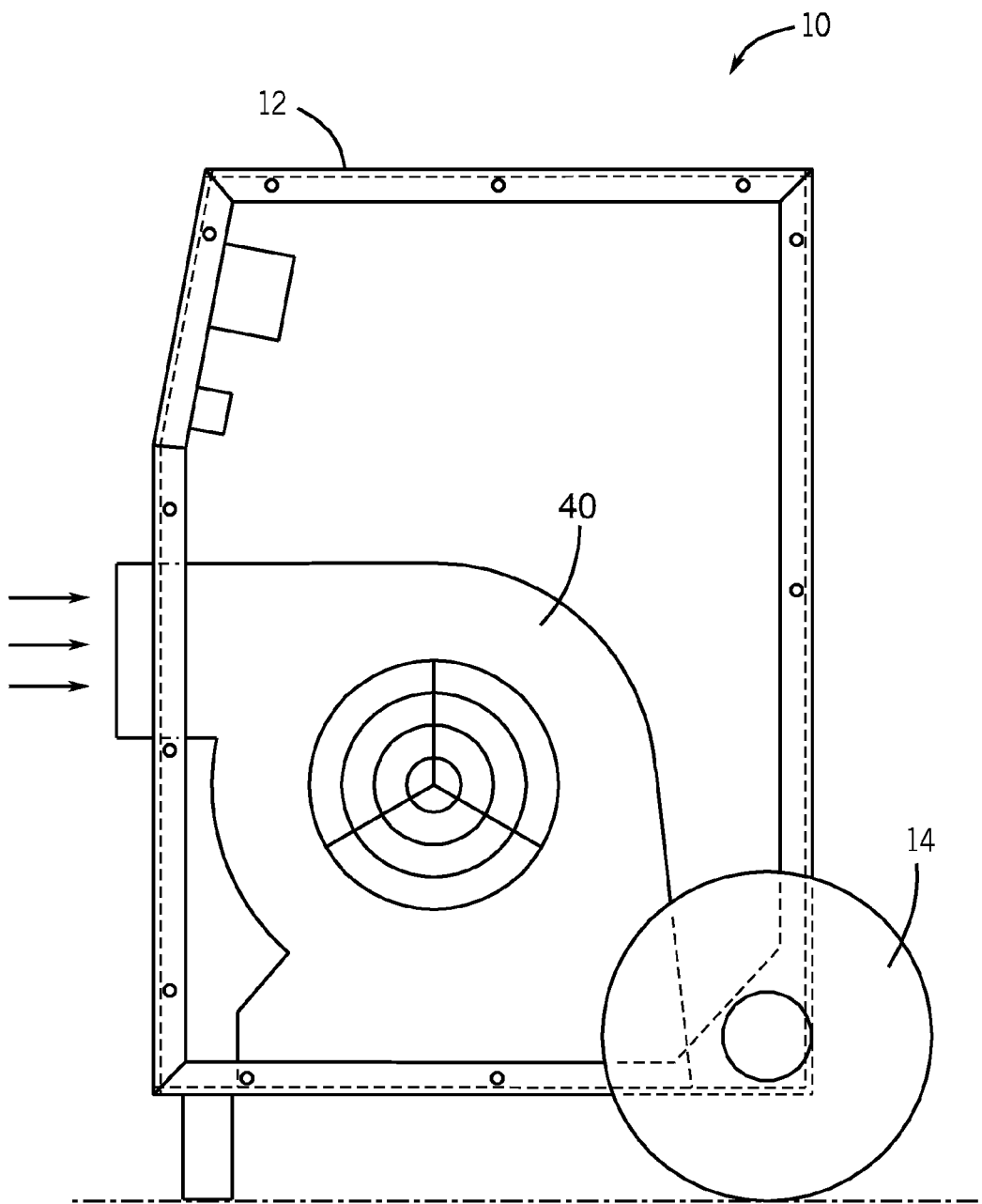
FIG. 6 is a cutaway side view of a portable battery charging apparatus including a vacuum, in accordance with an embodiment of the present invention.

FIG. 6 is a cutaway side view of a portable battery charging apparatus 10 including a vacuum 40 disposed within a main body 12, in accordance with an embodiment of the present invention. A base portion of the main body 12 may include wheels 14 adapted for moving the portable battery charging apparatus from one location to another.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A portable battery charging apparatus, comprising:
   a main body having a base portion, the base portion including one or more wheels adapted to allow the portable battery charging apparatus to be rolled from a first location to a second location;
   a battery charger disposed within the main body, the battery charger operable for charging a vehicle battery;
   an electrical functional unit disposed within the main body and having a function unrelated to vehicle battery charging; and
   a control panel disposed within the main body and having a control for the electrical functional unit.

2. The portable battery charging apparatus as recited in claim 1, wherein the electrical functional unit comprises a high volume fan.

3. The portable battery charging apparatus as recited in claim 2, wherein the high volume fan includes an output from which air is expelled.

4. The portable battery charging apparatus as recited in claim 3, wherein the high volume fan contains one or more adjustable deflectors capable of directing the expelled air in one or more desired directions.

5. The portable battery charging apparatus as recited in claim 3, wherein the main body comprises a front face, the front face having an upper portion distal to the base portion of the main body and a lower portion proximate to the base portion of the main body, and wherein the output is disposed within the lower portion of the front face.

6. The portable battery charging apparatus as recited in claim 1, wherein the electrical functional unit comprises an audio system having an audio source and a speaker.

7. The portable battery charging apparatus as recited in claim 6, wherein the audio source comprises a docking station capable of receiving audio from a portable media player when connected to the portable media player.

8. The portable battery charging apparatus as recited in claim 1, wherein the electrical functional unit comprises a flood light.

9. The portable battery charging apparatus as recited in claim 8, wherein the flood light is rechargeable and removable from the main body, the flood light operable when removed from the main body.

10. The portable battery charging apparatus as recited in claim 9, wherein the main body defines an inset cavity sized and shaped to fit the flood light, the inset cavity having disposed therein a charging cradle for the flood light.

11. The portable battery charging apparatus as recited in claim 1, wherein the electrical functional unit comprises a vacuum.

12. A portable battery charging apparatus, comprising:
    a main body having a base portion, the base portion including one or more wheels adapted to allow the portable battery charging apparatus to be rolled from a first location to a second location;
    a battery charger disposed within the main body, the battery charger operable for charging a vehicle battery;
    a high volume fan unrelated to the battery charger and disposed within the main body, the high volume fan including an output from which air is expelled, the high volume fan containing one or more adjustable deflectors capable of directing the expelled air in one or more desired directions; and
    a control panel disposed within the main body and having a control for the high volume fan.

13. A portable battery charging apparatus, comprising:
    a main body having a base portion, the base portion including one or more wheels adapted to allow the portable battery charging apparatus to be rolled from a first location to a second location;
    a battery charger disposed within the main body, the battery charger operable for charging a vehicle battery;
    an audio system comprising a docking station capable of receiving audio from a portable media player when connected to the portable media player and a speaker; and
    a control panel disposed within the main body and having a control for the audio system.

14. A portable battery charging apparatus, comprising:
    a main body having a base portion, the base portion including one or more wheels adapted to allow the portable battery charging apparatus to be rolled from a first location to a second location;
    a battery charger disposed within the main body, the battery charger operable for charging a vehicle battery;
    a rechargeable flood light removable from the main body; the main body defining an inset cavity sized and shaped to fit the rechargeable flood light, the inset cavity having disposed therein a charging cradle for the flood light; and
    a control panel disposed within the main body and having a control for the rechargeable flood light.

15. A portable battery charging apparatus, comprising:
- a main body having a base portion, the base portion including one or more wheels adapted to allow the portable battery charging apparatus to be rolled from a first location to a second location;
- a battery charger disposed within the main body, the battery charger operable for charging a vehicle battery; a vacuum disposed within the main body; and
- a control panel disposed within the main body and having a control for the vacuum.

* * * * *